United States Patent
Bergmann et al.

(10) Patent No.: US 11,887,278 B2
(45) Date of Patent: Jan. 30, 2024

(54) SYSTEM AND METHOD FOR TRAINING A NEURAL NETWORK TO FILL GAPS BETWEEN SCAN POINTS IN IMAGES AND TO DE-NOISE POINT CLOUD IMAGES

(71) Applicant: FARO Technologies, Inc., Lake Mary, FL (US)

(72) Inventors: Louis Bergmann, Stuttgart (DE); Daniel Flohr, Stuttgart (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 165 days.

(21) Appl. No.: 17/011,282

(22) Filed: Sep. 3, 2020

(65) Prior Publication Data

US 2021/0065431 A1   Mar. 4, 2021

Related U.S. Application Data

(60) Provisional application No. 62/895,660, filed on Sep. 4, 2019.

(51) Int. Cl.
*G06T 5/00* (2006.01)
*G06T 15/08* (2011.01)
*G06F 18/214* (2023.01)

(52) U.S. Cl.
CPC ............ *G06T 5/002* (2013.01); *G06F 18/214* (2023.01); *G06T 5/005* (2013.01); *G06T 15/08* (2013.01);
(Continued)

(58) Field of Classification Search
None
See application file for complete search history.

(56) References Cited

U.S. PATENT DOCUMENTS 8,705,012 B2   4/2014  Greiner et al.
2011/0317890 A1*  12/2011 Baroni .................. G06T 17/00
                                                            382/128
(Continued)

FOREIGN PATENT DOCUMENTS

WO   2019147767 A1   8/2019

OTHER PUBLICATIONS

Sarmad, Muhammad, Hyunjoo Jenny Lee, and Young Min Kim. "RI-gan-net: A reinforcement learning agent controlled gan network for real-time point cloud shape completion." Proceedings of the IEEE/CVF Conference on Computer Vision and Pattern Recognition. 2019. (Year: 2019).*

(Continued)

*Primary Examiner* — Sean M Conner
(74) *Attorney, Agent, or Firm* — McCarter & English, LLP

(57) ABSTRACT

An example method for training a neural network includes generating a training data set of point clouds. The training data set includes pairs of closed surfaces point clouds and non-closed surfaces point clouds. The method further includes, for each of the closed surface point clouds and the non-closed surface point clouds, generating a two-dimensional (2D) image by rendering a three-dimensional scene. The 2D image for the non-closed surfaces point clouds includes a gap in a surface, and the 2D image for the closed surfaces point clouds are free of gaps. The method further includes training the neural network to generate a trained neural network. The method further includes filling, using the trained neural network, gaps between scan points of the 2D image, and de-noising, using the trained neural network, scan point cloud data to generate a closed surface image of the scan point cloud data.

14 Claims, 17 Drawing Sheets
(12 of 17 Drawing Sheet(s) Filed in Color)

(52) U.S. Cl.
CPC ............... *G06T 2207/10028* (2013.01); *G06T 2207/20081* (2013.01); *G06T 2207/20084* (2013.01)

(56) References Cited

U.S. PATENT DOCUMENTS

| | | | | |
|---|---|---|---|---|
| 2016/0073081 | A1* | 3/2016 | Becker | G01S 7/51 348/43 |
| 2017/0139046 | A1* | 5/2017 | Ossig | G01S 17/89 |
| 2018/0113083 | A1* | 4/2018 | Van Dael | G01N 23/046 |
| 2018/0190017 | A1 | 7/2018 | Mendez et al. | |
| 2018/0300937 | A1* | 10/2018 | Chien | G06T 7/194 |
| 2019/0178643 | A1 | 6/2019 | Metzler et al. | |
| 2019/0311546 | A1* | 10/2019 | Tay | G05D 1/0088 |

OTHER PUBLICATIONS

Hu, Tao, et al. "Render4Completion: Synthesizing multi-view depth maps for 3D shape completion." Proceedings of the IEEE/CVF International Conference on Computer Vision Workshops. 2019. (Year: 2019).*

Han, Xiaoguang, et al. "Deep reinforcement learning of volume-guided progressive view inpainting for 3d point scene completion from a single depth image." Proceedings of the IEEE/CVF Conference on Computer Vision and Pattern Recognition. 2019. (Year: 2019).*

European Search Report Issued in European Application No. 20193494.0-1230 dated Jan. 25, 2021; 9 Pages.

Palla et al.; "Fully Convolutional Denoising Autoencoder for 3D Scene Reconstruction From a Single Depth Image"; The 2017 4th International Conference on Systems and Informatics (ICSAI 2017); 2017; pp. 566-575.

Sarkar et al.; "3D Shape Processing by Convolutional Denoising Autoencoders on Local Patches"; 2018 IEEE Winter Conference on Applications of Computer Vision; 2018; pp. 1925-1934.

Xia et al.; "Gibson Env: Real-World Perception for Embodied Agents"; Retrieved Online from arXiv:1803.10654v1 [cs.AI]; Aug. 31, 2018; 12 Pages.

Zhang et al.; "Deep Depth Completion of a Single RGB-D Image"; Retrieved Online from arXiv:1803.09326v2 [cs.CV]; May 2, 2018; 20 Pages.

* cited by examiner

SYSTEM AND METHOD FOR TRAINING A NEURAL NETWORK TO FILL GAPS BETWEEN SCAN POINTS IN IMAGES AND TO DE-NOISE POINT CLOUD IMAGES

CROSS REFERENCE TO RELATED APPLICATION

This application claims the benefit of U.S. Patent Application No. 62/895,660 filed Sep. 4, 2019 which is incorporated herein by reference in its entirety.

BACKGROUND

The subject matter disclosed herein relates generally to optical scanning, and more particularly to training a neural network to fill gaps between scan points in images and to de-noise point cloud images.

Laser scanners are typically used for scanning closed or open spaces like interior spaces of buildings, industrial installations, and tunnels. Laser scanners are used for many purposes, including industrial applications and accident reconstruction applications. A laser scanner can be used to optically scan and measure objects in a volume around the laser scanner. Laser scanners collect a variety of data points representing objects in the surrounding volume. Such data points are obtained by transmitting a beam of light onto the objects in the volume and collecting the reflected or scattered light to determine, for each point, a distance, two angles (for example, an azimuth and a zenith angle), and a grayscale value (i.e., a quantity related to the irradiance of the scattered light returned to the scanner). This raw scan data is collected, stored, and sent to a processor or processors to generate a scanner image that represents the objects measured in the three-dimensional (3D) volume surrounding the scanner, the scanner image being displayed on a monitor or similar device. In order to generate the scanner image, at least four values are collected for each data point. These four values may be the distance, two angles, and grayscale value, as described above, or they may be transformed values such as the x, y, and z coordinates, in addition to the grayscale value.

Many contemporary laser scanners also include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space if the field of view needs adjusting. In addition, the camera digital images may be transmitted to a processor to add color to the scanner image. In order to generate a color scanner image, at least six values (three positional coordinates such as x, y, z; and red value, green value, blue value or "RGB") are collected for each data point.

Accordingly, and while existing scanner processing systems may be suitable for their intended purpose, there remains a need in the art for scanner processing systems that improve upon these features as described herein.

This background information is provided, and no admission is necessarily intended, nor should be construed, that any of the preceding information constitutes prior art against the present invention.

SUMMARY

According to one aspect of the invention, a method for training a neural network comprises: generating a training data set of point clouds, the training data set comprising pairs of closed surfaces point clouds and non-closed surfaces point clouds; for each of the closed surface point clouds and the non-closed surface point clouds, generating a two-dimensional (2D) image by rendering a three-dimensional scene, wherein the 2D image for the non-closed surfaces point clouds include a gap in a surface, and wherein the 2D image for the closed surfaces point clouds are free of gaps; training the neural network, to generate a trained neural network, using the 2D images for the non-closed surface point clouds and the 2D images for the closed surface point clouds, the trained neural network being trained to fill in the gap in the surface of the 2D image for the non-closed surface point clouds; filling, using the trained neural network, gaps between scan points of the 2D image; and de-noising, using the trained neural network, scan point cloud data to generate a closed surface image of the scan point cloud data.

According to another aspect of the invention, a system for training a neural network comprises: a processor; and a memory, the memory including instructions that, upon execution by the processor, cause the processor to be operable to: generating a training data set of point clouds, the training data set comprising pairs of closed surfaces point clouds and non-closed surfaces point clouds; for each of the closed surfaces point clouds and the non-closed surface point clouds, generating a two-dimensional (2D) image by rendering a three-dimensional scene, wherein the 2D image for the non-closed surface point clouds include a gap in a surface, and wherein the 2D image for the closed surface point clouds are free of gaps; training the neural network, to generate a trained neural network, using the 2D images for the non-closed surface point clouds and the 2D images for the closed surface point clouds, the trained neural network being trained to fill in the gap in the surface of the 2D image for the non-closed surface point clouds; filling, using the trained neural network, gaps between scan points of the 2D image; and de-noising, using the trained neural network, scan point cloud data to generate a closed surface image of the scan point cloud data.

These and other advantages and features will become more apparent from the following description taken in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
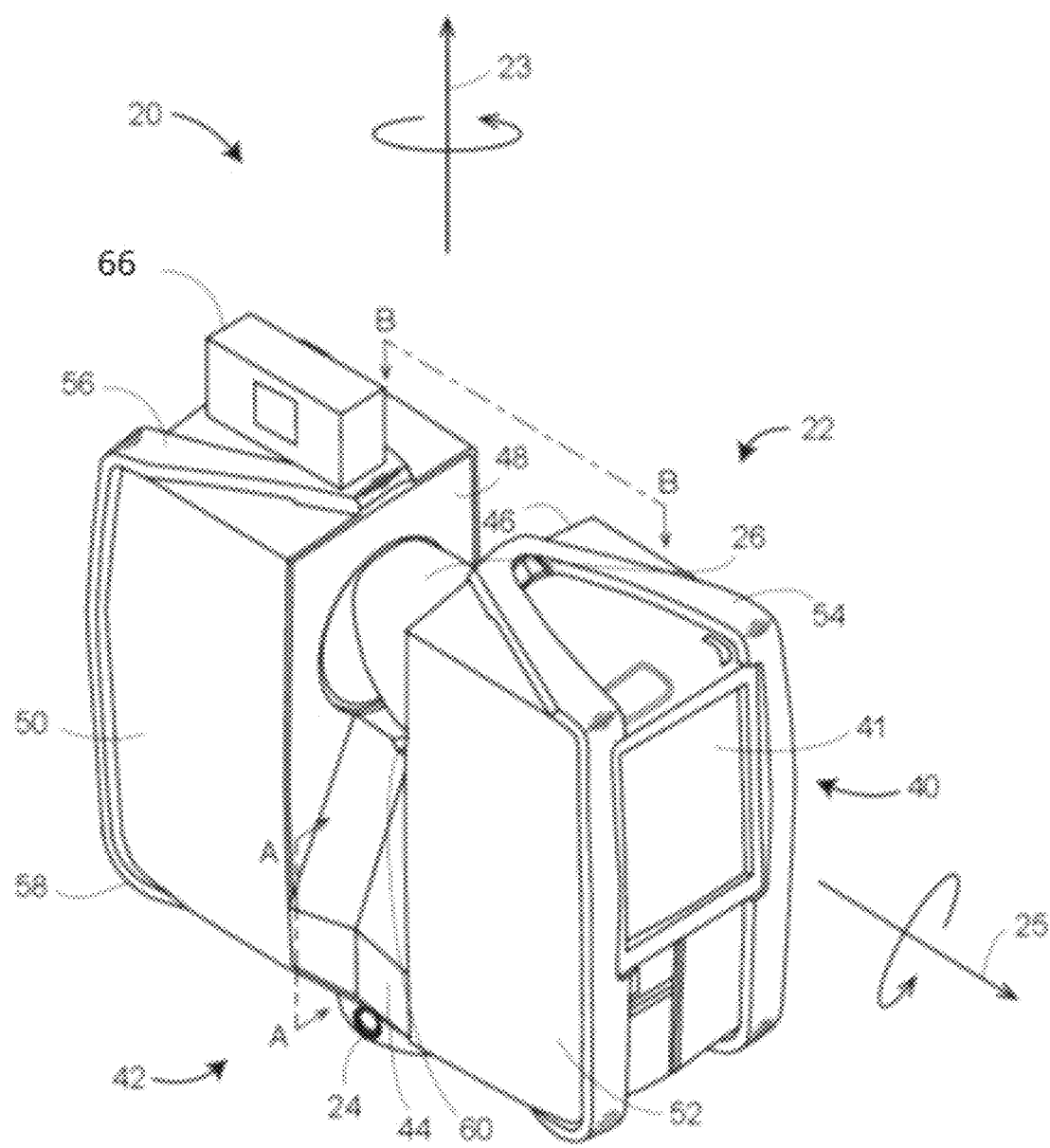
FIG. 1 is an isometric view of a laser scanner according to an embodiment.

The detailed description explains embodiments of the invention, together with advantages and features, by way of example with reference to the drawings.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Embodiments described herein provide technical solutions for training a neural network to fill gaps between scan points in images and to de-noise point cloud images. In particular, embodiments described herein provide an improved technique for rendering of laser scanner and photogrammetry point clouds by using a neural network that learns how to fill in gaps in between individual scan points in images and de-noises a scanned point cloud image to create an impression of closed surfaces.

One drawback of conventional techniques for capturing point clouds using laser scanners is that the point clouds include empty space in between the measured 3D points in the point cloud. This provides an unpleasant and inaccurate visual experience as these points break up when a virtual camera (e.g. on a computer display) moves closer to the scanned area and the illusion of a closed surface is lost. The resulting image produces an image having a noisy appearance where individual scan points are clearly visible. In other words, the empty spaces (i.e., gaps/holes) become visually evident in the image, which no longer appears to be a closed surface.

The techniques described herein, in various embodiments, address this deficiency by implementing artificial intelligence. In particular, the shortcomings in the prior art process may be eliminated through the use of a processor or processing system that leverages artificial intelligence (AI) to fill in gaps or holes between individual scan data points in images and de-noises point cloud images. Artificial intelligence and machine learning techniques have been utilized in many applications to streamline various processing including identifying and classifying objects. In addition, these technologies can learn from various datasets and converge on the proper classification with a high degree of certainty. The artificial intelligence is used herein to fill in the gaps/holes between scan points in images and de-noises point cloud images. Therefore, not as many images are needed to seed the algorithm.

As an example, the present techniques generate closed surface training data sets. A neural network is used to train a model, using the closed surface training data sets, to identify gaps/holes between individual scan points in images and so that the point cloud images are filled in to create an impression of a closed surface. For a given training data set, two point clouds are created: a first point cloud without closed surfaces and an associated second point cloud having a closed surface algorithm applied thereto. Closed surfaces can be created using meshes or by working directly on points of the point cloud.

A number of random viewpoints (or camera positions) are considered for training data sets. For each of the point clouds, a two-dimensional (2D) image is generated by rendering a 3D scene. These images are saved. The image derived from the first point cloud without closed surfaces has gaps/holes in the surfaces while the image derived from the associated second point cloud having the closed surfaces algorithm applied thereto will have fewer (or no) such gaps/holes. These image pairs can be used to train a neural network to fill in the gaps/holes without the need of creating large amounts of additional data, which is how conventional techniques address this problem. Accordingly, computing processing systems are improved by using fewer system resources (processing resources, memory resources, data storage resources, etc.) while capturing point clouds using laser scanners. This result is achieved by filling the gaps/holes between scan points in images and de-noising point cloud images using artificial intelligence. Moreover, the present techniques provide a more realistic impression of scanned data compared to the prior art approaches.

An example of the type of AI described in more detail herein includes convolutional neural networks. One example of a convolutional neural network (CNN) of interest includes the S-network. The S-network allows for the reduction of images to utilize as few as 5-10 images as the seed for the CNN, and the CNN is then able to fill in any remaining gaps/holes between the individual scan points. This provides increased time savings for the user during the scanning process. In some examples, the CNN identifies gaps/holes from previous datasets and fills in the gaps/holes between scan points. In examples, the CNN can be configured to recognize various objects in an image. For example, the CNN can be configured to identify a roadway, mulch or a brick surface, etc.

Figure 2:
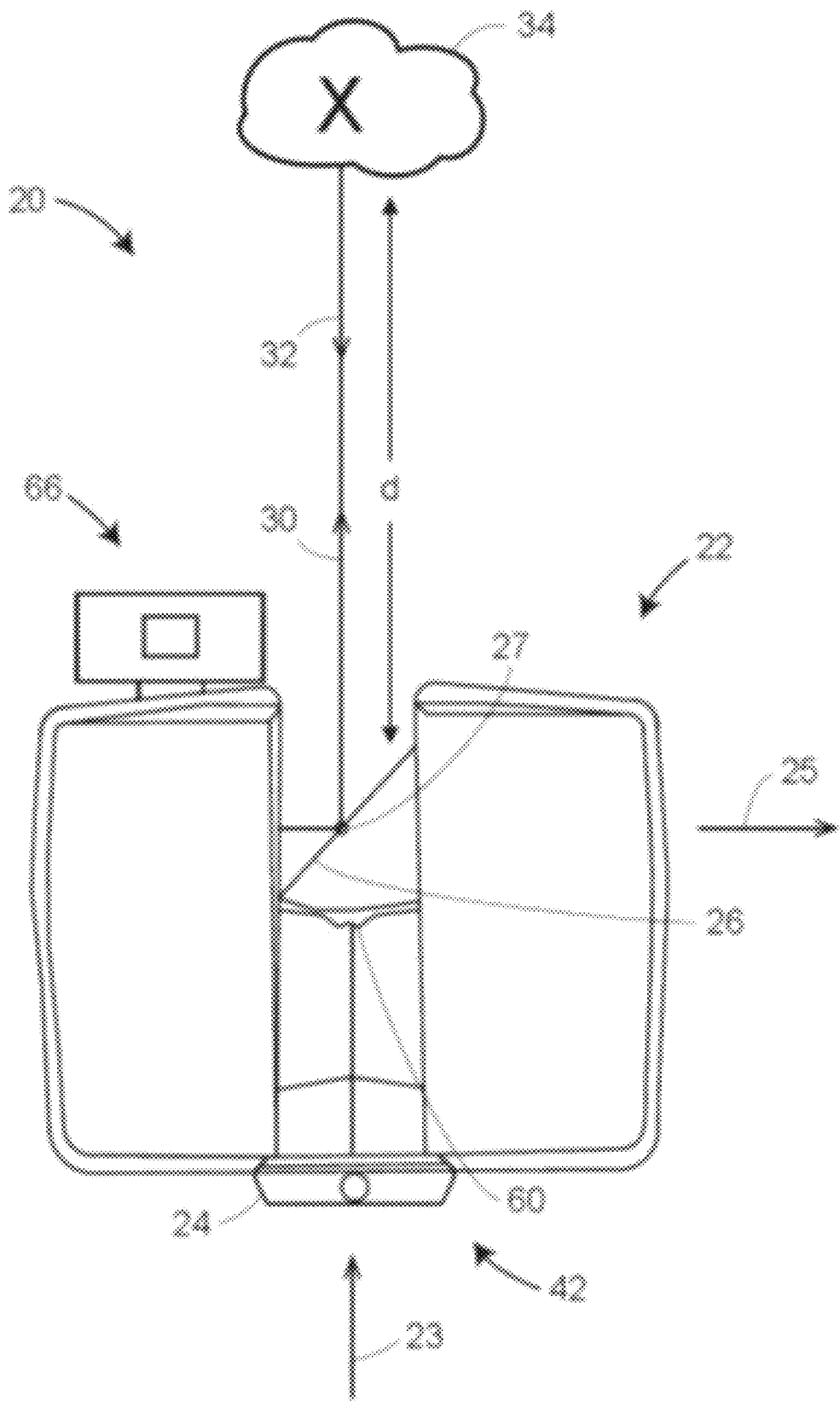
FIG. 2 is a side view of the laser scanner illustrating a method of measurement according to an embodiment.
Figure 3:
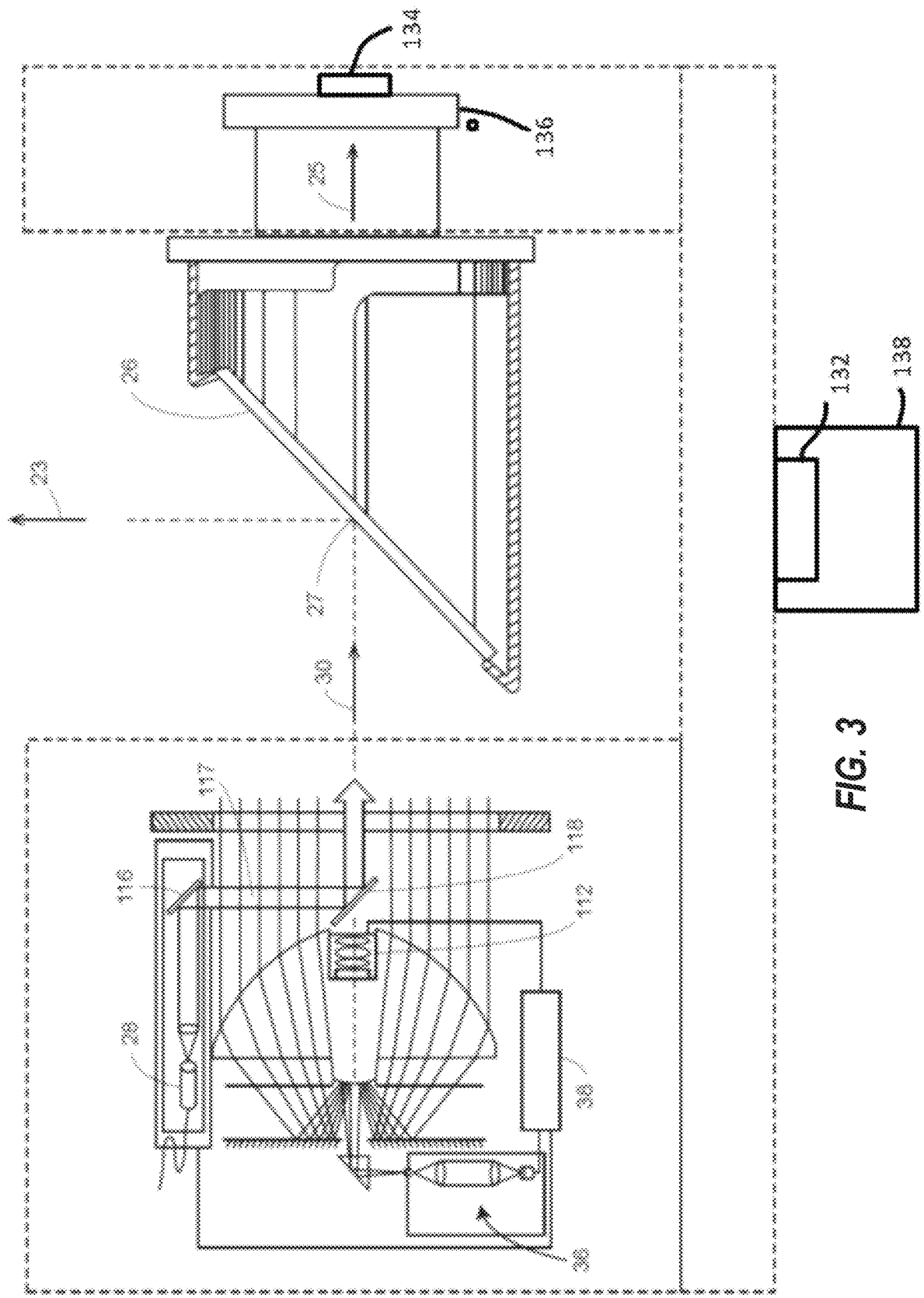
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to the vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example, 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions, in turn, depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect grayscale information related to the received optical power (equivalent to the term "brightness"). The grayscale value may be determined at least in part, for example, by the integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near-infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
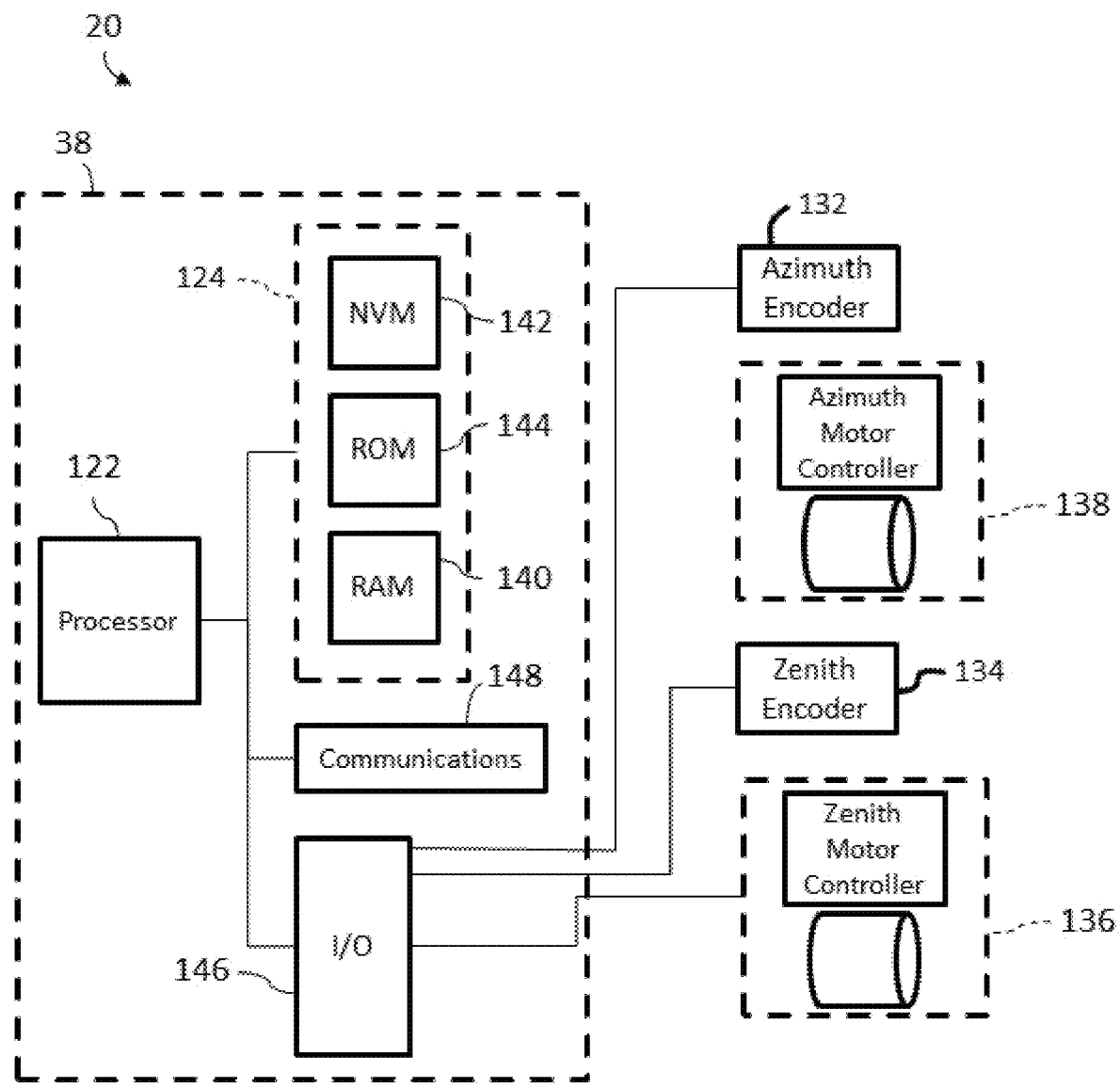
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements (or "processor") 122, which may be microprocessors, field-programmable gate arrays (FPGAs), digital signal processors (DSPs), and generally any device capable of performing computing functions. The one or more processing elements 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to the distance to an object, images of the environment, images acquired by panoramic camera 126, angular/rotational measurements by a first or azimuth encoder 132, and angular/rotational measurements by a second axis or zenith encoder 134.

In examples, controller 38 accepts data from encoders 132, 134, light receiver 36, light source 28, and/or panoramic camera 126 and is given certain instructions for the purpose of generating a 3D point cloud of a scanned environment. Controller 38 provides operating signals to the light source 28, light receiver 36, panoramic camera 126, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 140 may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processing elements 122 are coupled to memory 124. The memory 124 may include random access memory (RAM) device 140, a non-volatile memory (NVM) device 142, and/or a read-only memory (ROM) device 144. In addition, the processing elements 122 may be connected to one or more input/output (I/O) controllers 146 and a communications circuit 148. In an embodiment, the communications circuit 92 provides an interface that allows wireless or wired communication with one or more external devices or networks, such as the LAN discussed herein.

Controller 38 includes operation control methods embodied in application code. These methods are embodied in computer instructions written to be executed by processing elements 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

The controller 38 can be electrically coupled to a power source 72, which can include an alternating-current (AC) or direct-current (DC) power source. Examples of power sources include grid power, battery power, and the like.

Figure 5:
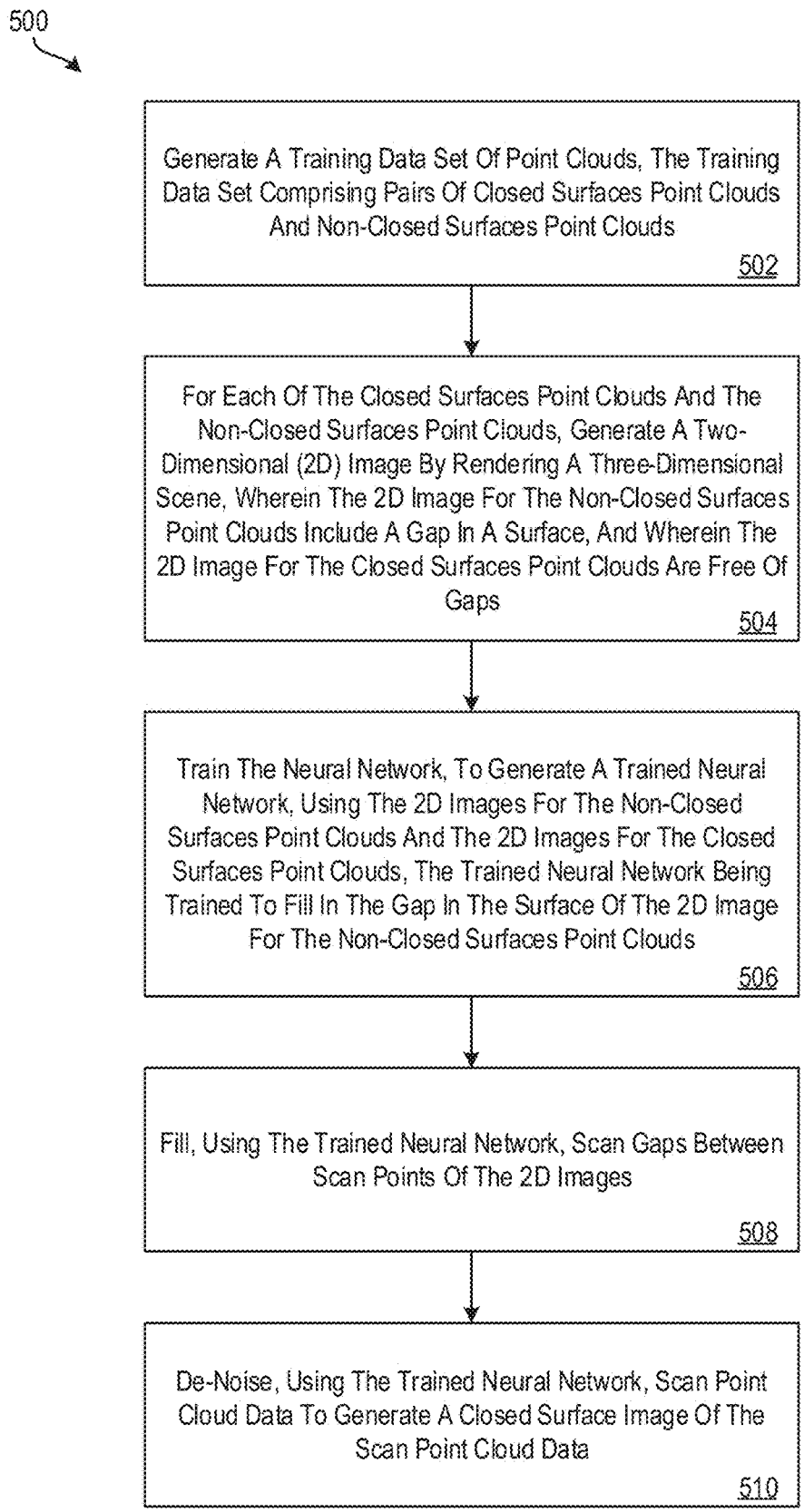
FIG. 5 depicts a flowchart of a method for training a neural network to fill gaps between scan points in images according to an embodiment.

Now referring to FIG. 5, a flowchart of a method 500 for filling gaps between scan points in images using artificial intelligence according to an embodiment is depicted. The method 500 can be performed by any suitable processing device, processing system, or combination thereof. For example, a processing system can include a processor (i.e., a processing device, such as a microprocessor, field-programmable gate array, digital signal processor, etc.) and a memory having machine-executable instructions stored thereon that are executable by the processor to perform functions. These functions can include the functions depicted in FIG. 5, which are now further described.

Figure 6B:
FIGS. 6A and 6B depict an example training data set having a non-closed surface point cloud and a closed surface point cloud according to an embodiment.
Figure 6A:
Figure 7A:
FIGS. 7A and 7B depict an example training data set having a non-closed surface point cloud and a closed surface point cloud according to an embodiment.
Figure 7B:
Figure 8B:
FIGS. 8A and 8B depict an example training data set having a non-closed surfaces point cloud and a closed surfaces point cloud according to an embodiment.
Figure 8A:
Figure 9A:
FIGS. 9A and 9B depict an example training data set having a non-closed surfaces point cloud and a closed surfaces point cloud according to an embodiment.
Figure 9B:
Figure 10B:
FIGS. 10A and 10B depict an example training data set having a non-closed surfaces point cloud and a closed surfaces point cloud according to an embodiment.
Figure 10A:

At block 502, a training data set of point clouds is generated. The training data set is made up of pairs of closed surfaces point clouds and non-closed surfaces point clouds. Examples of training data sets are depicted in FIGS. 6A, 6B, 7A, 7B, 8A, 8B, 9A, 9B, 10A, and 10B. In particular, FIGS. 6A and 6B depict an example training data set having a non-closed surface point cloud 600A and a closed surface point cloud 600B according to an embodiment. FIGS. 7A and 7B depict an example training data set having a non-closed surface point cloud 700A and a closed surface point cloud 700B according to an embodiment. FIGS. 8A and 8B depict an example training data set having a non-closed surface point cloud 800A and a closed surface point cloud 800B according to an embodiment. FIGS. 9A and 9B depict an example training data set having a non-closed surface point cloud 900A and a closed surface point cloud 900B according to an embodiment. FIGS. 10A and 10B depict an example training data set having a non-closed surface point cloud 1000A and a closed surface point cloud 1000B according to an embodiment. As shown in these examples, the respective non-closed surface point clouds 600A, 700a, 800a, 900A, 1000A appear noisy due to the gaps/holes between points. The respective closed surface point clouds 600B, 700B, 800B, 900B, 1000B appear as closed surfaces because the noise has been removed (i.e., the gaps/holes have been filled in). Graphical de-noisers can be used to generate the training data set of point clouds, like those shown in FIGs. FIGS. 6A, 6B, 7A, 7B, 8A, 8B, 9A, 9B, 10A, and 10B.

Once the training data set is generated, the method proceeds to block 504. At block 504, for each of the closed surface point clouds and the non-closed surface point clouds, a two-dimensional (2D) image is generated by rendering a three-dimensional scene. The 2D image for the non-closed surface point clouds include a gap in a surface (see, e.g., FIGS. 6A, 7A, 8A, 9A, 10A), and wherein the 2D image for the closed surface point clouds are free of gaps (see, e.g., FIGS. 6B, 7B, 8B, 9B, 10B). In examples, the 2D images are two-and-a-half-dimensional (2.5D) images.

At block 506, the neural network is trained. In particular, a trained neural network is generated using the 2D images for the non-closed surfaces point clouds and the 2D images for the closed surfaces point clouds. The trained neural network is particularly trained to fill in the gap in the surface of the 2D image for the non-closed surface point clouds. For example, artificial neural networks can be used for image recognition to make predictions to identify objects. The neural network can learn (i.e., be trained) to identify fill in the gaps/holes in the surface of 2D images for non-closed surfaces point clouds by training the model using labeled training data to detect and fill the gaps/holes. In an embodiment, the training data set of point clouds can be generated using prior art techniques (e g manual techniques) for training the model (see block 502). In an embodiment, the training allows the model to detect/identify and fill in gaps/holes in the surface of a 2D image for a non-closed surface point cloud. After the model is trained, a validation data set can be used to tune the parameters of the model. Finally, a test data set can be used to assess the performance of the model. The test data set generally applies combinations of inputs to the model that the model has not been previously trained. If the results are satisfactory the model is used to make predictions. Otherwise, the model can be trained, validated, and tested again until the model is optimized. In one or more embodiments, if enough training data is provided where the training data is based on the scan data with "real" information, the AI-predicted gap filling can be improved.

Once the neural network is trained, the trained neural network is used at block 508 to fill scan gaps between scan points of the 2D images. The gaps are pixels filled with background color. By filling in the gaps, the color of the pixels is changed to match neighboring pixels so that the pixels no longer appear as gaps. The three-dimensional position of each point is respected in deciding which gaps to fill and which points lie in the background, e.g., are not visible in the final image anymore as they are covered by the foreground surface.

At block 510, the trained neural network is used to de-noise scan point cloud data to generate a closed surface image of the scan point cloud data. In examples, the de-noising is performed in real-time or near-real-time. This can save closed surface preprocessing time, which can take up to five times, for example, longer than the proposed technical solutions described herein. The presently described technical solutions can also save data storage space (e.g., hard disk space, solid-state drive space, etc.) over prior art approaches (e.g., about one-fifth as much space as prior art approaches).

In one or more embodiments, other types of neural network architectures can be used. For example, the neural network can be a convolutional neural network (CNN). A CNN, such as the s-shape network, is a type of artificial neural network architecture that is particularly powerful regarding computer vision applications. CNNs are less complex when compared to other image classification algorithms.

In examples, the method 500 can further include performing, using a scanner such as the laser scanner of FIGS. 1-3, a scan of an environment. The method 600 can further include generating scan point cloud data from the scan. The scan point cloud data includes the scan points and the scan gaps between the points. The de-noising is performed on the generated scan point cloud data to generate the closed surface image of the scan point cloud data. In examples, the scan gaps are areas between foreground pixels in the scan point cloud data. In examples, the de-noising the scan point cloud data includes overwriting background pixels of the scan point cloud data.

Figure 11A:
FIG. 11A depicts an example image prior to applying the steps of the method of FIG. 5 according to an embodiment.

FIG. 11A depicts an example image 1100A prior to applying the steps of the method 500 according to an embodiment. As shown, the example image 1100A includes regions 1101, 1102, 1103, among others, that include gaps/holes between scan points. These gaps/holes result from fixed points of the scan points being too small. These gaps/holes appear as noise and can provide an undesirable viewing experience to a user. To address this, the present techniques can be applied to de-noise the image 1100A using a neural network trained according to the embodiments described herein.

Figure 11B:
FIG. 11B depicts an example image subsequent to applying the steps of the method of FIG. 5 according to an embodiment.
Figure 11C:
FIG. 11C depicts an example image subsequent to applying the steps of the method of FIG. 5 according to an embodiment.

As shown, the example image 1100B still includes regions 1111, 1112, among others, that include gaps/holes between scan points. It can be observed that the difference between the images 1100A, 1100B of FIGS. 11A, 11B respectively are that the existing points are larger in the image 1100A as compared to the image 1100B. Merely drawing each point covering more pixels on the screen in an effort to fill gaps, as done in the example image 1100B of FIG. 11B, decreases detail in areas of the image that do not contain gaps. Further, as shown in the image 1100B, gaps remain even when drawing each point covering more pixels (e.g., the region 1111 of the left area of the image 1100B). These gaps/holes result from fixed points of the scan points being too small in some places as shown. This information can be used to further train/refine the neural network to account for these regions 1111, 1112.

Figure 11D:
FIG. 11D depicts a bird's eye view of the example image of FIG. 11C according to an embodiment.

As shown, the example image 1100C uses optimal point sizes throughout and thus eliminates the regions 1101-1103, 1111, and 1112. The results provide a pleasant and acceptable viewing experience free from noise. This example image 1100C can be manipulated (e.g., zoomed out, rotated, panned, etc.) as shown in the example bird's eye view image 1100D of FIG. 11D.

Figure 12A:
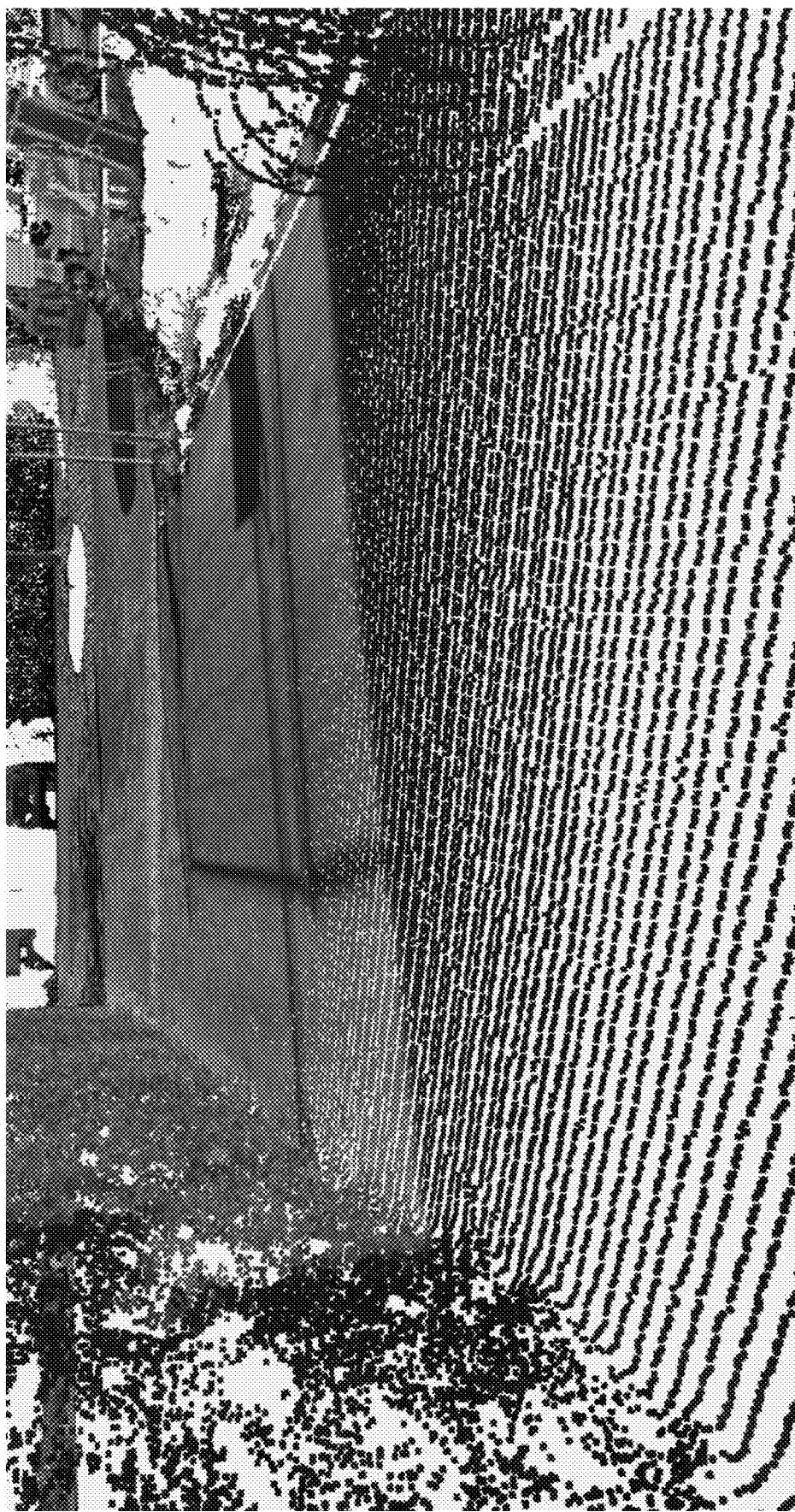
FIG. 12A depicts an example image with scan points and scan gaps between the scan points according to an embodiment.
Figure 12B:
FIG. 12B depicts the example of FIG. 12A in which the scan gaps between the scan points are filled in using the method of FIG. 5 according to an embodiment.

FIG. 12A depicts an example image 1200A with scan points 1201 and scan gaps 1202 between the scan points 1201 according to an embodiment. In this example, the bottom portion of the example image 1200A shows spare areas with significant scan gaps 1202 between the scan points 1201. When the techniques described herein, such as the steps of the method 500, are applied, the result is a closed surface image 1200B as depicted in FIG. 12B. In this example, the scan gaps 1202 between the scan points 1201 have been eliminated, thus providing an improved closed surface image.

It should be appreciated that while embodiments herein refer to the systems of FIGS. 1-4 as being used in connection with a laser projection system, this is for example purposes and the claims should not be so limited. In addition, it is to be understood that the steps described with reference to FIG. 5 are not intended to limit the scope of the invention.

It should be appreciated that while embodiments herein described the point cloud as being generated by a time-of-flight scanner, this is for example purposes and the claims should not be so limited. In other embodiments, the point cloud may be generated by other types of scanners or measurement devices, such as but not limited to: photogrammetry devices, area scanners, triangulation scanners, structured light scanners, and laser line probes for example.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A method for training a neural network, the method comprising:

performing, using a laser scanner having a color camera, a scan of an environment, the laser scanner being configured to measure a plurality of three-dimensional (3D) coordinates based at least in part on the speed of light in air;

generating scan point cloud data from the scan, the scan point cloud data comprising scan points and gaps between the scan points;

generating a training data set of point clouds, the training data set comprising pairs of closed surfaces point clouds and non-closed surfaces point clouds;

for each of the closed surface point clouds and the non-closed surface point clouds, generating a two-dimensional (2D) image by rendering a 3D scene, the 2D image having a plurality of target objects and a plurality of background objects, wherein the 2D image for the non-closed surfaces point clouds include gaps, and wherein the 2D image for the closed surfaces point clouds are free of gaps, wherein the 2D image comprises color information associated with the plurality of target objects and the plurality of background objects, the color information being obtained from the color camera;

training the neural network, to generate a trained neural network, using the 2D images for the non-closed surface point clouds and the 2D images for the closed surface point clouds, the trained neural network being trained to identify one or more gaps in one or more surfaces of the plurality of target objects rather than in the plurality of background objects and fill in the one or more gaps in the one or more surfaces of the plurality of target objects of the 2D image for the non-closed surface point clouds;

filling, using the trained neural network, the one or more gaps in the one or more surfaces of the plurality of target objects between the scan points of the 2D image for the non-closed surfaces point clouds based at least in part on the color information; and de-noising, using the trained neural network, the scan point cloud data to generate a closed surface image of the scan point cloud data.

2. The method of claim 1, wherein the one or more gaps are areas between foreground pixels in the scan point cloud data.

3. The method of claim 2, wherein filling the one or more gaps between the scan points comprises overwriting background pixels of the scan point cloud data.

4. The method of claim 1, wherein the neural network is a convolutional neural network.

5. The method of claim 1, wherein the de-noising is performed in near real-time.

6. The method of claim 1, wherein at least one of the 2D image for the non-closed surface point clouds or the 2D image for the closed surface point clouds is a two-and-a-half-dimensional (2.5D) image.

7. The method of claim 1, further comprising identifying, using the trained neural network, the one or more gaps in the plurality of target objects rather than in the plurality of background objects based at least in part on different depth information between the plurality of target objects and the plurality of background objects.

8. The method of claim 1, wherein filling the one or more gaps between the scan points of the 2D image for the non-closed surfaces point clouds comprises changing color information of the one or more gaps to match color information of neighboring pixels.

9. A system for training a neural network, the system comprising:

a processor; and a memory, the memory including instructions that, upon execution by the processor, cause the processor to be operable to:

perform, using a laser scanner having a color camera, a scan of an environment, the laser scanner being configured to measure a plurality of three-dimensional (3D) coordinates based at least in part on the speed of light in air;

generate scan point cloud data from the scan, the scan point cloud data comprising scan points and gaps between the scan points;

generate a training data set of point clouds, the training data set comprising pairs of closed surfaces point clouds and non-closed surfaces point clouds;

for each of the closed surfaces point clouds and the non-closed surface point clouds, generate a two-dimensional (2D) image by rendering a 3D scene, wherein the 2D image for the non-closed surface point clouds include gaps, and wherein the 2D image for the closed surface point clouds are free of gaps, wherein the 2D image comprises color information associated with the plurality of target objects and the plurality of background objects, the color information being obtained from the color camera;

train the neural network, to generate a trained neural network, using the 2D images for the non-closed surface point clouds and the 2D images for the closed surface point clouds, the trained neural network being trained to identify one or more gaps in one or more surfaces of the plurality of target objects rather than in the plurality of background objects and fill in the one or more gaps in the one or more surfaces of the plurality of target objects of the 2D image for the non-closed surface point clouds;

fill, using the trained neural network, the one or more gaps in the one or more surfaces of the plurality of target objects between the scan points of the 2D image for the non-closed surfaces point cloud based at least in part on the color information; and de-noise, using the trained neural network, the scan point cloud data to generate a closed surface image of the scan point cloud data.

10. The system of claim 9, wherein the one or more gaps are areas between foreground pixels in the scan point cloud data.

11. The system of claim 10, wherein filling the one or more gaps between the scan points comprises overwriting background pixels of the scan point cloud data.

12. The system of claim 9, wherein the neural network is a convolutional neural network.

13. The system of claim 9, wherein the de-noising is performed in near real-time.

14. The system of claim 9, wherein the 2D image for the non-closed surface point clouds or the 2D image for the closed surface point clouds is a two-and-a-half-dimensional (2.5D) image.

* * * * *